(No Model.)
R. M. HERMANCE.
HEATER.
No. 589,085. Patented Aug. 31, 1897.
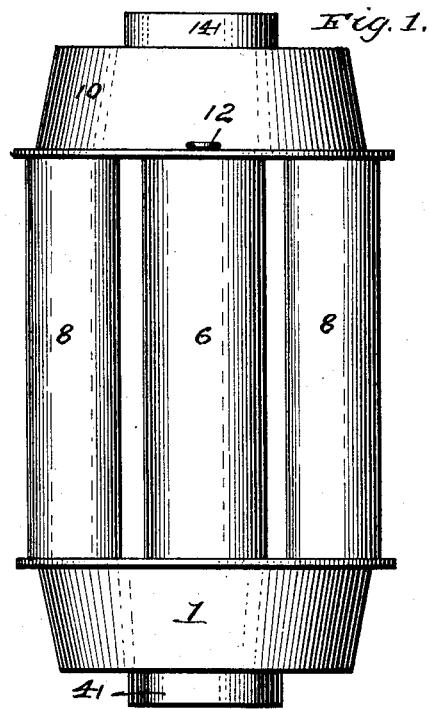
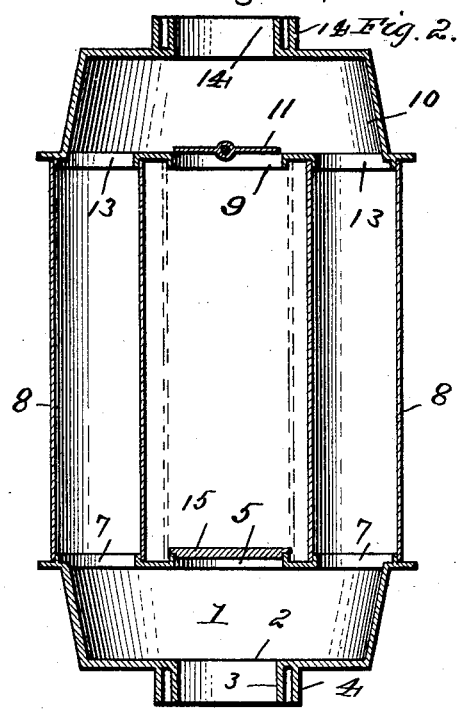
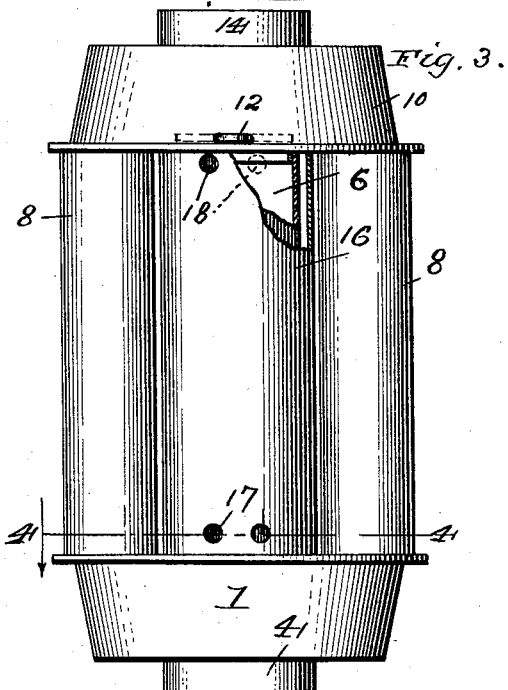
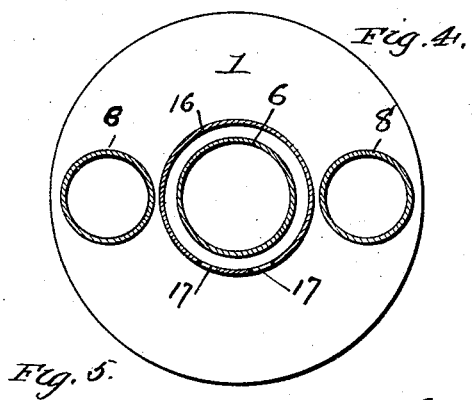
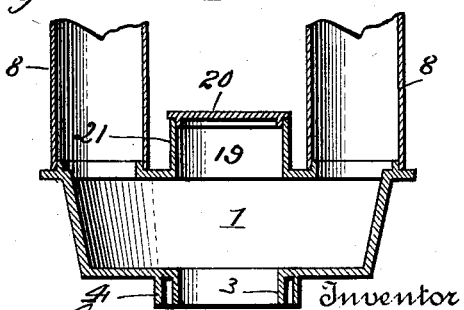
Witnesses
G. M. Lamasure
G. H. Walmsley.
Inventor
Richard M. Hermance
By Alexander & Davis
Attorneys

UNITED STATES PATENT OFFICE.

RICHARD M. HERMANCE, OF POUGHKEEPSIE, NEW YORK.

HEATER.

SPECIFICATION forming part of Letters Patent No. 589,085, dated August 31, 1897.

Application filed September 16, 1896. Serial No. 605,893. (No model.)

*To all whom it may concern:*

Be it known that I, RICHARD M. HERMANCE, a citizen of the United States, residing at Poughkeepsie, in the county of Dutchess and State of New York, have invented certain new and useful Improvements in Heaters, of which the following is a specification, reference being had therein to the accompanying drawings.

This invention relates to a new and improved heater adapted for use upon stovepipes; and it has for its object to provide a simple device which may take the place of a section of the pipe and while not retarding the draft yet utilize for heating purposes a portion of the heat which usually passes off through the stovepipe and is wasted.

The invention consists of certain novel combination and construction of parts, hereinafter described, and particularly pointed out in the claims appended.

In the drawings, Figure 1 is a side elevation of my heater, the removable jacket being omitted; Fig. 2, a vertical sectional view of the same, both the jacket and the central draft-tube being removed and the opening in the lower casing being closed by a removable plate; Fig. 3, a view of my heater complete, parts of the jacket and central tube being broken away; Fig. 4, a horizontal section on the line 4 4 of Fig. 3; and Fig. 5, a detail vertical section of the lower casing, showing a slight modification.

Referring to the drawings by numerals, 1 designates the base of the heater, which is a hollow cylindrical casing of suitable depth, its lower side being formed with a central inlet 2, surrounded by two concentric flanges 3 and 4, which are adapted to receive stovepipes, the two collars adapting the casing to be fitted to two different-sized pipes. In the center of the upper surface of the base is an outlet 5, over which a direct-draft pipe 6 is is adapted to be removably fitted. On either side of the outlet 5 is an outlet 7, and around each of said openings is formed a vertical flange, over which the vertical pipes 8 8 are secured.

The upper end of the direct-draft pipe 6 is removably fitted around a central opening 9, formed in the lower side of a cylindrical casing 10, and adapted to close the opening 9 is a damper 11, a handle 12 extending from said damper to the outer side of casing 10. The upper ends of the flues or pipes 8 are fitted over flanges formed around openings 13 in the lower side of casing 10 on each side of the central opening 9.

From the center of the upper side of casing 10 and around the outlet 14ª extend two concentric vertical flanges 14 14 of the same diameter as the depending flanges on the bottom of casing 1 and for a similar purpose.

When it is desired to utilize the heat of the gases from the stove, the damper 11 is closed, thereby converting the direct-draft pipe 6 into a heating-chamber, the products of combustion passing first into said chamber, and then back to casing 1, and then out through the side pipes 8. The direct-draft pipe 6 is removable from the casings, and when removed, as shown in Fig. 2, damper 11 is closed and a cover or plate 15 is placed over the opening 5 in the base. This is desirable when the device is used to heat upper rooms, as the plate 15 is a convenient place for heating water and for other purposes of heating.

In Fig. 3 an air-heating jacket 16 surrounds the direct-draft pipe, said jacket fitting closely between the base and top of the heater. This jacket is larger than the pipe 6 and is formed with openings 17 at its base, which lead into the air-space formed around pipe 6 by the jacket. At its upper end the jacket is provided with openings 18, which permit the heated air to escape into the room, the colder air passing into the air-space through the lower openings.

In Fig. 5 the flange formed around the opening 5 is extended for a suitable distance to form a short pipe 21, and when the pipe 6 is removed a flanged cover 20 is fitted to said flange for the purpose of forming a heating-chamber 19.

It is manifest that a device constructed as described will form a very economical heater and one capable of a variety of uses.

An essential feature lies in the fact that the direct-draft tube is made removable independently of the damper which controls it. It will be observed that the damper 11 is mounted in the upper casing or drum directly over the opening communicating with pipe 6, whereby this damper may be employed to close the opening when the pipe is removed, a suitable removable plate being employed to close the lower opening in the lower casing. It will also be observed that the damper 11 may be employed to regulate the draft even after the tube 6 is removed, as by opening the damper more or less colder air from the room may be admitted into the stovepipe and thereby retard the draft.

Having thus fully described my invention, what I claim, and desire to secure by Letters Patent, is—

1. In a heater, the combination of a top and bottom casing, adapted each to be connected to a stovepipe connection, a direct-draft pipe connecting them, a jacket surrounding said direct-draft pipe and forming an air-space around it, said jacket being provided with an opening near each end, side flues connecting the top and bottom casing, and a damper adapted to regulate the draft through the direct-draft pipe, substantially as described.

2. In a stovepipe-heater, the combination of a lower casing adapted to be connected to a stovepipe, and having an opening in its upper side, said opening being adapted to receive a removable plate, an upper casing provided with an opening in its under side and adapted to be connected to a stovepipe, a removable direct-draft pipe connecting said openings in the casings, side flues connecting the casings, and a damper supported in the upper casing over the opening communicating with the direct-draft tube, substantially as described.

In testimony whereof I affix my signature in presence of two witnesses.

RICHARD M. HERMANCE.

Witnesses:
MURRAY HOWARD,
OGDEN SEELYE.